July 30, 1929.  C. S. PELLOW  1,722,390
NUT SOCKET

Filed April 2, 1927

INVENTOR.
C. S. Pellow
BY Edward N. Pagelsen
ATTORNEY.

Patented July 30, 1929.

1,722,390

UNITED STATES PATENT OFFICE.

CHARLES S. PELLOW, OF DETROIT, MICHIGAN.

NUT SOCKET.

Application filed April 2, 1927. Serial No. 180,505.

This invention relates to means for holding and turning nuts between the saws which successively cut slots across their ends in castellating machines of the type shown and described in the patent issued to Charles E. Pellow, No. 1,624,180 on April 12, 1927; and the object of my invention is to provide a nut socket with a recess of such size that the nuts can be quickly inserted and from which they will readily fall when finished, and in which the nuts will be held from moving laterally.

Figure 1:
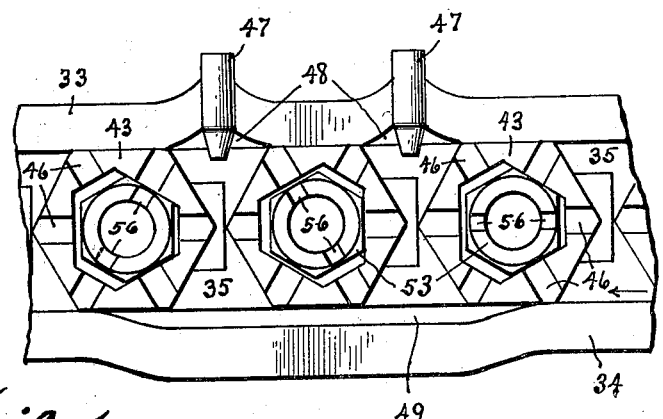
Figure 2:
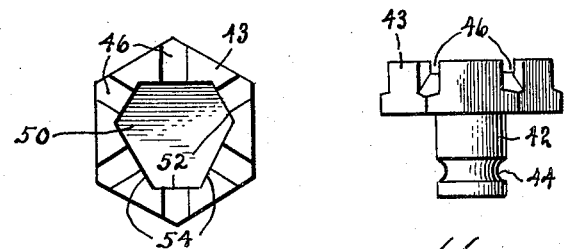
Figure 3:
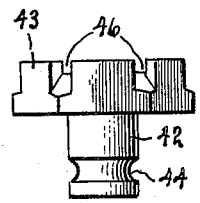

This invention is embodied in the nut carrier shown in the accompanying drawing, in which Fig. 1 is a plan of the nut guide and the nut carriers positioned therein; Fig. 2 is a plan of a nut carrier; and Fig. 3 is a side elevation thereof.

Similar reference characters refer to like parts throughout the several views.

The only change in the mechanism shown in the drawings of said patent is in the shape of the socket guides, in the recess in the nut carrier and in the means provided for turning the carrier one-third rotation instead of one-sixth rotation as in the original mechanism. The sockets in the carriers of the original machine were true polygons in cross section, usually hexagons, and necessarily somewhat larger than the nuts which were being castellated. The objection to such construction is that the nuts could move laterally, the distance depending upon the looseness of the fit of the nuts in these sockets.

As in the original machine, the links 35 of the carrier chain are formed with cylindrical sockets to receive the stems 42 of the nut sockets 43 and the stems of these sockets are formed with grooves 44 to receive proper retainers to prevent the stems falling out of the links. Each nut socket is formed with notches 46 to receive the pins 47 extending from the guide gib 33 which is normally parallel to the guide gib 34 except at these pins. The gib 33 is formed with a recess 48 at each pin 47 and the gib 34 with a longer recess 49. The nut sockets are prevented from turning by the guide gibs except where a pin 47 enters a notch 46 and rotates a socket one-sixth of a rotation, the two pins serving to turn the nut one-third rotation.

The recesses 50 are shown to be substantially equilateral triangles with their corners cut off, or hexagons with alternate long and short sides. The sides 52 are shorter than the sides of the nuts 53 so that when the nut 55 is pushed into the tapering space between the sides 54, it will be rigidly held therein. One of the shorter sides is always the rear side of the recess and at right angles to the gibs while the carrier passes beneath a saw to have the groove 56 cut therein. The upper portions of the notches 46 are preferably continued across the sockets to serve as paths for the saws so that deeper recesses may be employed.

Because of this peculiar shape of the recesses, these may be made very much larger than the nuts so that the nuts can be easily dropped into the sockets and as easily drop out, and the danger of a nut being locked in the socket by a metal shaving is substantially eliminated.

I claim:—

1. A rotatable nut socket for the work carrier of a castellating machine having a recess whose cross section is polygonal, adjacent sides of such recess being of different lengths and the longer sides being parallel to the sides of an equilateral triangle.

2. A rotatable nut socket for the work carrier of a castellating machine having a recess whose cross section is polygonal, alternate sides of the recess being shorter than the sides of the nuts to be received in said recess, the remaining sides of said recess being sufficiently longer than said sides of the nut to permit ready insertion and removal of the nut, said shorter sides permitting the longer sides to grip said nut.

3. In a castellating machine, a rotatable nut socket having notches in its periphery and having a recess whose cross section is polygonal, adjacent sides of such recess being of different lengths and the longer sides being parallel to the sides of an equilateral polygon, guides for such socket, and a pair of pins spaced longitudinally of said guides and adapted to engage said notches to turn said socket, said guides being normally parallel to prevent the socket from turning but each being formed with a recess at said pins to permit the socket to be turned within said recess successively by both of said pins.

CHARLES S. PELLOW.